US 8,541,150 B2

(12) United States Patent
Liu

(10) Patent No.: US 8,541,150 B2
(45) Date of Patent: Sep. 24, 2013

(54) MANUFACTURING METHOD OF POLYMER FILM WITH PHOTONIC CRYSTAL STRUCTURE

(75) Inventor: Jui-Hsiang Liu, Tainan (TW)

(73) Assignee: National Cheng Kung University, Tainan (TW)

( * ) Notice: Subject to any disclaimer, the term of this patent is extended or adjusted under 35 U.S.C. 154(b) by 305 days.

(21) Appl. No.: 13/049,281

(22) Filed: Mar. 16, 2011

(65) Prior Publication Data

US 2012/0052421 A1    Mar. 1, 2012

(30) Foreign Application Priority Data

Aug. 25, 2010    (TW) ................................ 99128545 A

(51) Int. Cl.
    *G03F 7/20*    (2006.01)
(52) U.S. Cl.
    USPC .............. 430/20; 430/290; 430/321; 430/945
(58) Field of Classification Search
    None
    See application file for complete search history.

(56) References Cited

U.S. PATENT DOCUMENTS

| | | | |
|---|---|---|---|
| 6,589,445 B2 | 7/2003 | Sugiyama et al. | |
| 7,077,984 B1* | 7/2006 | Natarajan et al. | 252/582 |
| 2003/0214690 A1* | 11/2003 | Escuti et al. | 359/15 |
| 2011/0229806 A1* | 9/2011 | Lin et al. | 430/5 |

FOREIGN PATENT DOCUMENTS

| | | |
|---|---|---|
| JP | 2003-139978 | 5/2003 |
| WO | WO 2010/131046 A1 * | 11/2010 |

* cited by examiner

*Primary Examiner* — John A. McPherson
(74) *Attorney, Agent, or Firm* — Muncy, Geissler, Olds & Lowe, PLLC

(57) ABSTRACT

A manufacturing method of a polymer film with the photonic crystal structure includes a mixing step for at least mixing an achiral liquid crystal (LC), a chiral dopant, a monomer and a photo initiator together to form an LC-monomer mixture, at least one exposure step for exposing the LC-monomer mixture through a mask, at least one diffusion step for diffusing the monomer from the area around one of the exposure areas to the exposure area, and a LC removing step for removing the achiral LC to form the polymer film. By implementing the diffusion step after the exposure step, the polymerization rate of the monomers is enhanced so as to increase the proportion of the polymer in the polymer film and raise the imprint rate of chirality. Therefore, the polymer film can reveal stronger photonic crystal structure and property of Bragg reflection when it is not filled with any fluid.

32 Claims, 9 Drawing Sheets

MANUFACTURING METHOD OF POLYMER FILM WITH PHOTONIC CRYSTAL STRUCTURE

CROSS REFERENCE TO RELATED APPLICATIONS

This Non-provisional application claims priority under 35 U.S.C. §119(a) on Patent Application No(s). 099128545 filed in Taiwan, Republic of China on Aug. 25, 2010, the entire contents of which are hereby incorporated by reference.

BACKGROUND OF THE INVENTION

1. Field of Invention

The present invention relates to a manufacturing method of a polymer film and, in particular, to a manufacturing method of a polymer film with the photonic crystal structure.

2. Related Art

After the progressive and development of flat panel display (FPD) devices, the FPD devices have gradually replaced the traditional CRT (Cathode Ray Tube) display devices because of their superior properties of lighter, thinner, low power consumption, and no irradiation. Moreover, the FPD devices are now applied to various kinds of electronic products. The cholesteric liquid crystal is a typical material used in the display technology such as the bi-stable display (e.g. electronic paper).

FIG. 1 is a schematic diagram showing the molecular arrangement of the cholesteric liquid crystal 11, which can be the chiral cholesteric liquid crystal or achiral cholesteric liquid crystal doped with chiral compounds. The cholesteric liquid crystal molecule typically has a chiral center. Thus, the liquid crystal molecules can be stacked in parallel and arranged in layers. The liquid crystal layers are in parallel to each other, and the liquid crystal molecules of each layer are aligned in the same direction. The lengthwise axle of the liquid crystal molecules is in parallel to the surface of the layer. In addition, the lengthwise axles of liquid crystal molecules in every adjacent two layers are regularly rotated with a certain angle, so that the stacked layers can form a spiral structure. When the stacked layers are totally rotated for 360 degrees, the direction the lengthwise axle of liquid crystal molecules comes back to the initial direction, which defines a pitch P. The liquid crystal molecules with the above-mentioned spiral structure can polarize the inputted light and then emit a light with a specific wavelength. In addition, the pitch can determine the wavelength of the strongest reflective light.

FIG. 2 and FIG. 3 are schematic diagrams showing the molecule arrangements of the cholesteric liquid crystal. As shown in FIG. 2, the cholesteric liquid crystal 11 is sandwiched between two glass substrates 12 and 13, a black absorption layer 14 is configured at the bottom. When the electronic field is not applied, the cholesteric liquid crystal 11 forms a planar texture. Since the spiral period (pitch) is roughly the same as the wavelength of light, the above-mentioned periodical structure can induce the Bragg reflection for the light of specific wavelength. The peak of the reflected light is $\lambda=nP$, wherein n is the average refractive index. In general, this reflection feature can be applied to the optical components and liquid crystal displays. FIG. 3 further illustrates the alignment of the focal-conic cholesteric liquid crystal.

Currently, the optical film with the Bragg reflection feature can be designed and manufactured with the cholesteric liquid crystal. For example, it may include the pure cholesteric liquid crystal film or the polymer film doped with the cholesteric liquid crystal.

In the polymer stabilized cholesteric liquid crystal, a few amount of monomer (less than 10%) can be added, so that the monomer can be distributed in the cholesteric liquid crystal, thereby forming the stabilized planar texture and achieving the Bragg reflection effect. However, the cholesteric liquid crystal is a very expensive material, so the manufacturing cost increases. This is the reason why the cholesteric liquid crystal can not be widely used.

Therefore, it is an important subject of the present invention to provide a novel method for manufacturing a polymer film of photonic crystal structure without using the cholesteric liquid crystal. Moreover, the manufactured polymer film may have the Bragg reflection effect without containing any of liquid crystal or fluid. Thus, the manufacturing cost thereof can be sufficiently reduced, and the application fields thereof can be broadened.

SUMMARY OF THE INVENTION

In view of the foregoing subject, an objective of the present invention is to provide a novel method for manufacturing a polymer film of photonic crystal structure without using the cholesteric liquid crystal. Moreover, the manufactured polymer film may have the Bragg reflection effect without containing any of liquid crystal or fluid. Thus, the manufacturing cost thereof can be sufficiently reduced, and the application fields thereof can be broadened.

To achieve the above objective, the present invention discloses a manufacturing method of a polymer film with photonic crystal structure including a mixing step, at least one exposure step, at least one diffusion step, and a liquid crystal (LC) removing step. The mixing step is for at least mixing an achiral liquid crystal (LC), a chiral dopant, a monomer and a photo initiator together to form an LC-monomer mixture, which is filled in a light-permeable container. The exposure step is for exposing the LC-monomer mixture through a mask. The diffusion step is for diffusing the monomer from an area around one of exposure areas to the exposure area. The LC removing step is for removing the achiral LC to form the polymer film.

To achieve the above objective, the present invention also discloses a manufacturing method of a polymer film with photonic crystal structure including a mixing step, at least one exposure step, at least one diffusion step, and a LC removing step. The mixing step is for at least mixing a chiral liquid crystal (LC), a monomer and a photo initiator together to form an LC-monomer mixture, which is filled in a light-permeable container. The exposure step is for exposing the LC-monomer mixture through a mask. The diffusion step is for diffusing the monomer from an area around one of exposure areas to the exposure area. The LC removing step is for removing the chiral LC to form the polymer film.

To achieve the above objective, the present invention also discloses a manufacturing method of a polymer film with photonic crystal structure, including a mixing step, at least one exposure step, at least one diffusion step, and a LC removing step. The mixing step is for at least mixing an achiral liquid crystal (LC), a chiral dopant, a monomer and a photo initiator together to form an LC-monomer mixture, which is filled in a light-permeable container. The exposure step is for exposing at least one exposure area of the LC-monomer mixture by a laser. The diffusion step is for diffusing the monomer from an area around one of the exposure areas to the exposure area. The LC removing step is for removing the achiral LC to form the polymer film.

To achieve the above objective, the present invention also discloses a manufacturing method of a polymer film with photonic crystal structure, including a mixing step, at least one exposure step, at least one diffusion step, and a LC removing step. The mixing step is for at least mixing a chiral liquid crystal (LC), a monomer and a photo initiator together to form an LC-monomer mixture, which is filled in a light-permeable container. The exposure step is for exposing at least one exposure area of the LC-monomer mixture by a laser. The diffusion step is for diffusing the monomer from an area around one of the exposure areas to the exposure area. The LC removing step is for removing the chiral LC to form the polymer film.

In one embodiment of the present invention, the manufacturing method further includes a step of repeating the exposure step and the diffusion step. Due to the repeat exposure steps and diffusion steps, the polymerization rate of the monomers can be obviously increased, so that the polymer film can reveal stronger photonic crystal structure and property of Bragg reflection.

In one embodiment of the present invention, the diffusion step is further to statically place the LC-monomer mixture for a while, and preferably, the LC-monomer mixture is protected from being irradiated, thereby enhancing the diffusion efficiency.

In one embodiment of the present invention, at least two of the exposure areas of the LC-monomer mixture are involved in the exposure step with different exposure times, exposure intensities, and exposure periods. Due to the different exposure times, exposure intensities, exposure periods, and/or diffusion periods, the cholesteric liquid crystal structures in the exposure areas may have different pitches and/or refractive indexes. Accordingly, the wavelength of the light through the Bragg reflection can be changed.

In one embodiment of the present invention, the photonic crystal structure is a cholesteric liquid crystal structure. In practice, it can be formed by imprinting the cholesteric liquid crystal or a mixture including the achiral LC and chiral dopant.

In one embodiment of the present invention, the manufacturing method further includes a filling step for filling a fluid in the polymer film. The fluid can be a gas or a liquid, such as an isotropic liquid or an anisotropic liquid. For example, the isotropic liquid may be a solvent, and the anisotropic liquid may be a liquid crystal. The solvent is, for example, methanol, acetone, THF (Tetrahydrofuran), chloroform, or toluene. The liquid crystal is, for example, a cholesteric liquid crystal, a nematic liquid crystal, or a smectic liquid crystal. If the filled liquid is an isotropic liquid, it can be controlled by the electrical field to achieve the desired display function. In addition, regarding to the display module, the required amount of the filled liquid (e.g. liquid crystal) in the polymer film can be sufficiently reduced.

In one embodiment of the present invention, the above-mentioned fluid can be further polymerized to enhance the stabilization of the polymer film. Herein, it is unnecessary to seal the fluid after the polymerization.

In one embodiment of the present invention, the manufacturing method further includes a step of attaching a transparent conductive film on one side of the polymer film, which contains the fluid. For example, the transparent conductive film can be attached on the top side and the bottom side of the polymer film. The configuration of the transparent conductive film can control the molecular orientation and refraction index of the fluid (e.g. the anisotropic liquid) so as to change the color of the reflected light.

In one embodiment of the present invention, when a plurality of polymer films are formed, the manufacturing method further includes a step of stacking the polymer films to form a multi-layer polymer film. The polymer films can be formed by utilizing the left-handed liquid crystal and the right-handed liquid crystal. Accordingly, the brightness of the reflected light of the polymer film can be enhanced.

As mentioned above, the present invention includes the exposure step for exposing at least one exposure area of the LC-monomer mixture, and the diffusion step for diffusing the monomer from the area around the exposure area to the exposure area. Thus, the polymerization rate of the monomers can be enhanced, and the proportion of the polymer in the polymer film and raise the imprint rate of chirality can be increased. Therefore, the polymer film can reveal stronger photonic crystal structure and property of Bragg reflection without being filled with any fluid. In addition, due to the repeat exposure steps and diffusion steps, the polymerization rate of the monomers can be obviously increased so as to provide stronger photonic crystal structure and property of Bragg reflection. Moreover, the present invention can file different fluids including gas or liquid to present different color of the reflected light, thereby broadening the applications of the polymer film. Furthermore, due to the different exposure times, exposure intensities, exposure periods, or diffusion periods, the cholesteric liquid crystal structures in different exposure areas may have different pitches and/or refractive indexes. Accordingly, the wavelength of the light through the Bragg reflection can be changed. In addition, the photonic crystal structure of the polymer film of the present invention can present the Bragg reflection without containing the expansive cholesteric liquid crystal, so that the manufacturing cost can be sufficiently decreased.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
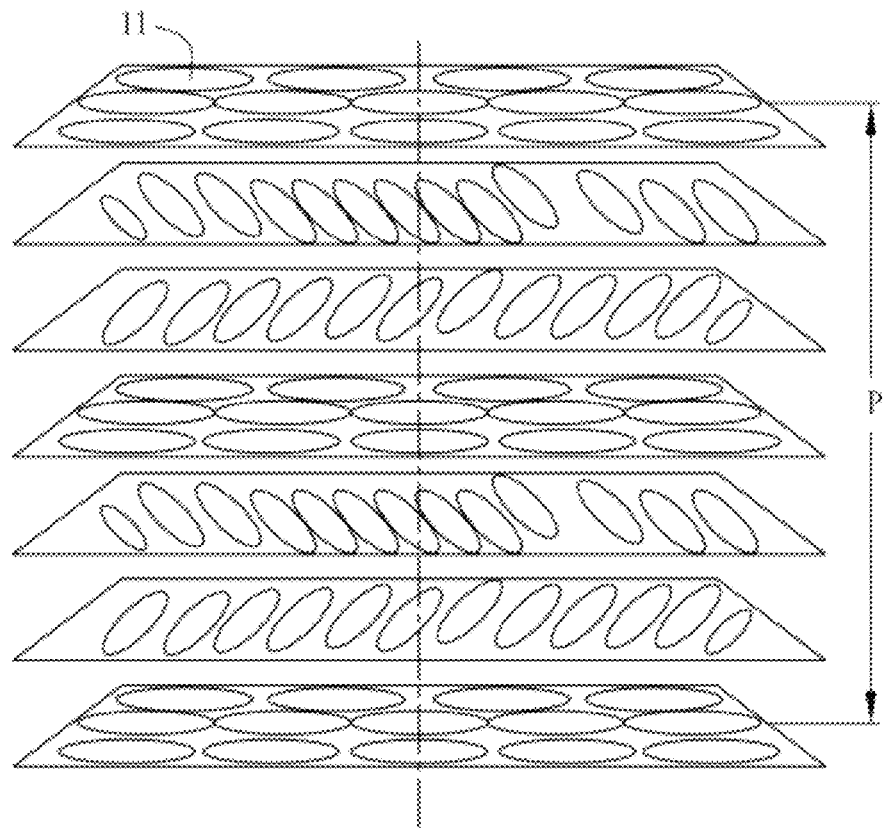
FIG. 1 is a schematic diagram showing the molecule alignment of the cholesteric liquid crystal.
Figure 2:
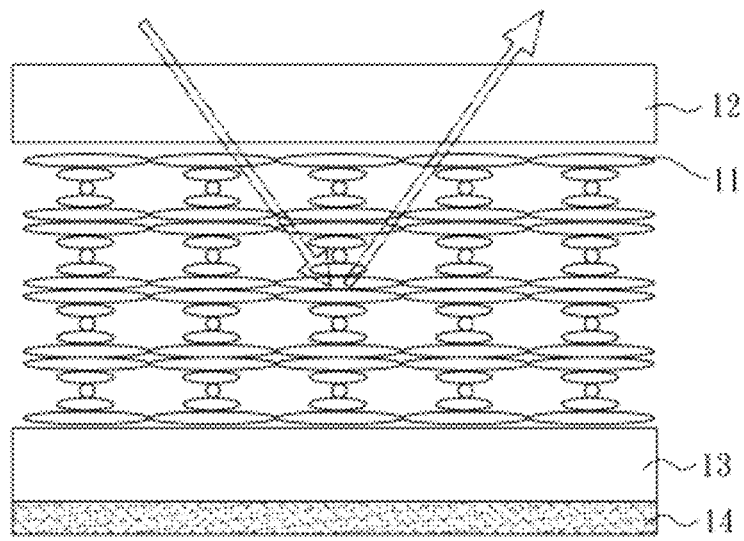
FIG. 2 is a schematic diagram showing the cholesteric liquid crystal with planar texture alignment and having the property of Bragg reflection.
Figure 3:
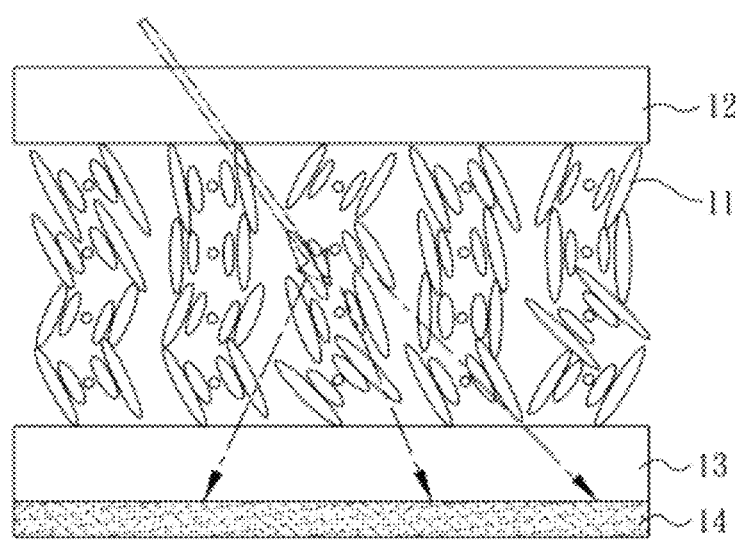
FIG. 3 is a schematic diagram showing the cholesteric liquid crystal with focal-conic alignment.
Figure 4:
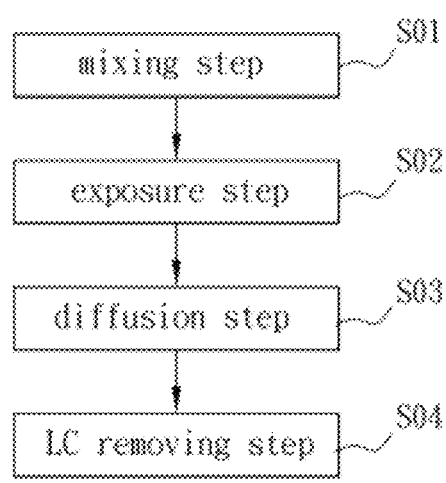
FIG. 4 is a flow chart of the manufacturing method of a polymer film with the photonic crystal structure according to a preferred embodiment of the present invention.

FIG. 4 is a flow chart of the manufacturing method of a polymer film with the photonic crystal structure according to a preferred embodiment of the present invention. The manufacturing method includes the steps S01 to S04.

Step S01: a mixing step for at least mixing an achiral liquid crystal (LC), a chiral dopant, a monomer and a photo initiator together to form an LC-monomer mixture, which is filled in a light-permeable container. For example, the light-permeable container may have a light-permeable portion or an opening for the light to pass through. In this step S01, it is also possible to mix a chiral liquid crystal, a monomer and a photo initiator, and the chiral dopant is not added. The chiral liquid crystal can be any kind of cholesteric liquid crystal.

In this embodiment, the achiral liquid crystal is the liquid crystal without chirality, such as the nematic liquid crystal or smectic liquid crystal. The chiral dopant can induce the achiral liquid crystal to generate the spiral alignment and thus provide the chirality to the achiral liquid crystal. The chiral dopant is for example a cyanobiphenyl derivative. The monomer can be a monomer with single or dual functional groups. In this embodiment, the monomer is a monomer with dual functional groups for example, and it may have the liquid crystal phase. For example, the monomer is BAHB (4,4'-Bis (6-acryloyxy-hexyloxy)biphenyl), so that it can achieve the orientation efficient for stabling liquid crystal through the photo polymerization reaction. In addition, it is also possible to mix the monomer with single function group and the monomer with multiple functional groups to form the cross-linked polymer, which has resistance from solving in solvent. The function of the photo initiator is to initiate the photo polymerization reaction of the monomer while the monomer is irradiated by light.

In the present embodiment, the achiral liquid crystal is between 10% and 80% in weight, and the monomer is between 20% and 90% in weight. In practice, the percentages of the achiral liquid crystal, chiral dopant, monomer and photo initiator in the LC-monomer mixture are 53.3%, 13.3%, 33.3% and 0.1%. After well mixing under room temperature, the LC-monomer mixture can present the cholesteric liquid crystal phase. To be noted, the increase of the polymerization rate of the monomer (prior art is less than 10%) can raise the imprint rate of chirality of the polymer in the polymer film. Therefore, the polymer film can reveal stronger photonic crystal structure and property of Bragg reflection.

Figure 5:
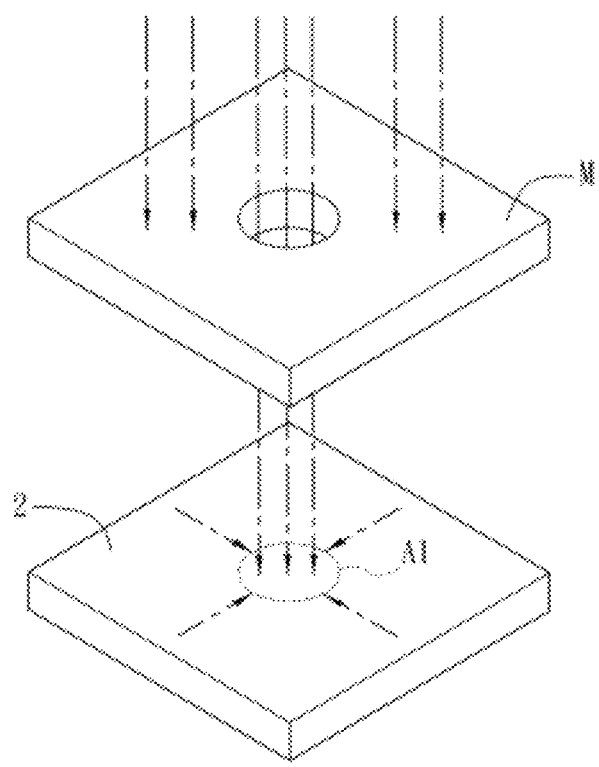
FIG. 5 is a schematic diagram showing the exposure step with utilizing the mask according to the preferred embodiment of the present invention.

Step S02: an exposure step for exposing the LC-monomer mixture through a mask. In this embodiment, a UV light (e.g. 254 nm) is used to irradiate the LC-monomer mixture, so that the monomer can have the photo polymerization reaction to form the desired polymer so as to imprint the chirality of the liquid crystal to the polymer. Because the present embodiment uses the cholesteric liquid crystal phase to perform the imprinting, the photonic crystal structure of the polymer film can be the cholesteric liquid crystal structure. FIG. 5 shows the exposure step with utilizing the mask. The UV light can pass through a mask M to selectively expose the LC-monomer mixture 2 so as to form an exposure area A1. The pattern of the mask M is not limited in this embodiment.

Step S03: a diffusion step for diffusing the monomer from an area around the exposure area A1 to the exposure area A1. After the exposure step, the monomer in the exposure area has been polymerized to form the polymer. Thus, the concentration of the monomer in the exposure area is less than that in the area around the exposure area, so that the monomer in the area around the exposure area can travel to the exposure area A1 by diffusion. Accordingly, the polymerization rate of the monomer can be increased. In the diffusion step, the LC-monomer mixture can be statically placed for a while, and the LC-monomer mixture should be protected from being irradiated in this period. In addition, the manufacturing method of the present invention may perform several times of the exposure step and the diffusion step to sufficiently increase the polymerization rate of the monomer. Moreover, the different exposure steps can expose the same area or different areas.

Figure 6A:
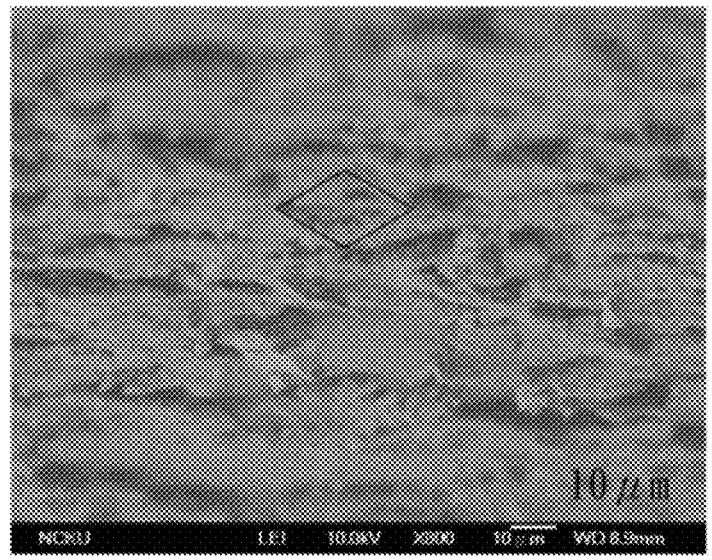
FIG. 6A and FIG. 6B are the SEM images of the cross-section of the polymer film.
Figure 6B:
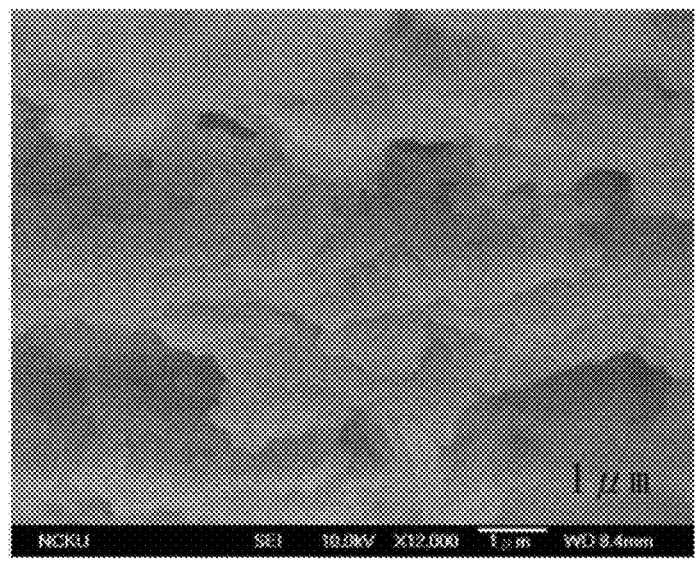

Step S04: a LC removing step for removing the achiral LC to form a polymer film. In the step S04, an organic solvent, such as acetone or chloroform, is used to remove the achiral LC. After the liquid crystal is completely removed from the polymer film, the polymer film is then dried. Since the dual functional groups have a certain durability, the cross-linked monomer becomes insoluble so that the organic solvent can not remove the polymer. FIG. 6A and FIG. 6B are the SEM images of the cross-section of the polymer film, and FIG. 6B is an enlarged view of the rhombus area in the FIG. 6A. Referring to FIG. 6A and FIG. 6B, the SEM images shows the high conversion structure of the polymer.

Figure 7:
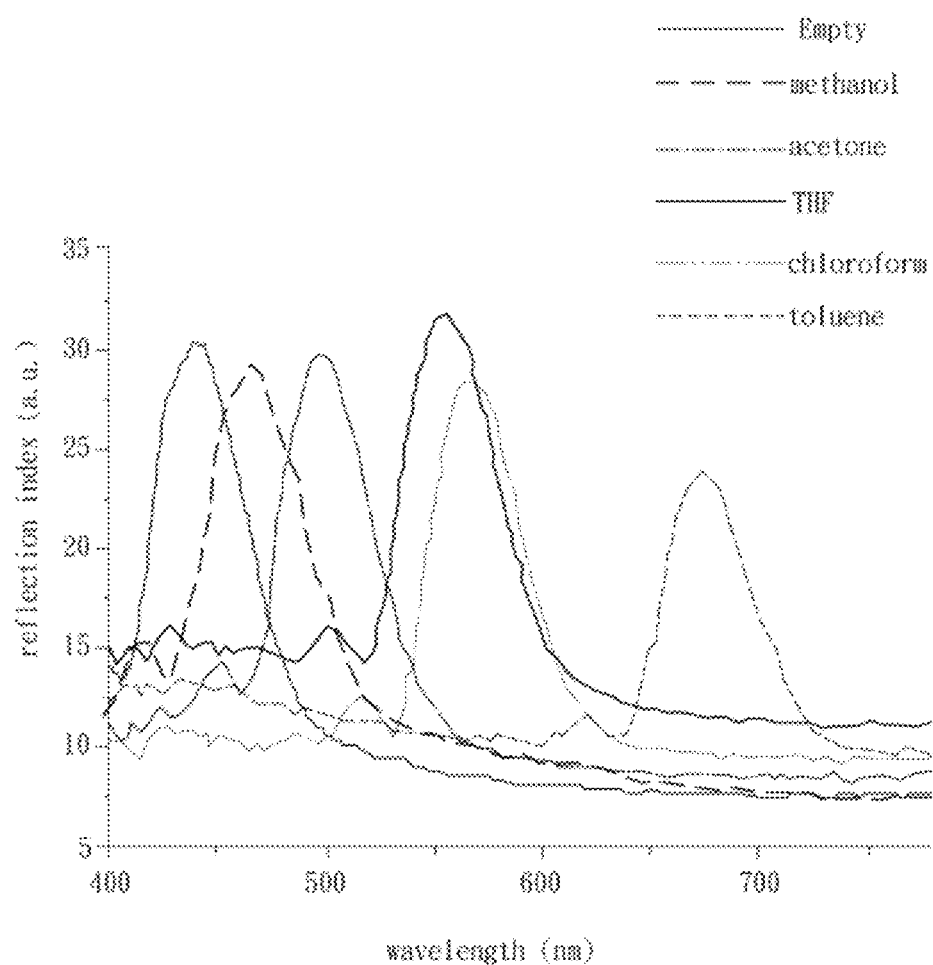
FIG. 7 is a schematic diagram showing the reflection index of the polymer film manufactured by the manufacturing method of the present invention and filled with different liquids at different wavelengths.

FIG. 7 is a schematic diagram showing the reflection index of the polymer film manufactured after the step S04 at different wavelengths. Even if the polymer film does not contain the liquid crystal molecules, it can still have the property of Bragg reflection. In addition, the manufacturing method may further include a filling step for filling a fluid in the polymer film. The fluid can be gas or liquid, such as an isotropic liquid or an anisotropic liquid. For example, the isotropic liquid may be a solvent, and the anisotropic liquid may be a liquid crystal. The solvent is, for example, methanol, acetone, THF (Tetrahydrofuran), chloroform, or toluene. The liquid crystal is, for example, a cholesteric liquid crystal, a nematic liquid crystal, or a smectic liquid crystal. FIG. 7 shows the reflection rate of the polymer film, which is filled with methanol (refraction index is 1.3284), acetone (refraction index is 1.3586), THF (refraction index is 1.4072), chloroform (refraction index is 1.4458), and toluene (refraction index is 1.4969) respectively, at different wavelengths. Due to the variations of the refraction indexes of the solvents, the wavelengths of the reflected light are different. This phenomenon matches the Bragg reflection principle of $\lambda=nP$, wherein n is the average reflection index.

Figure 8:
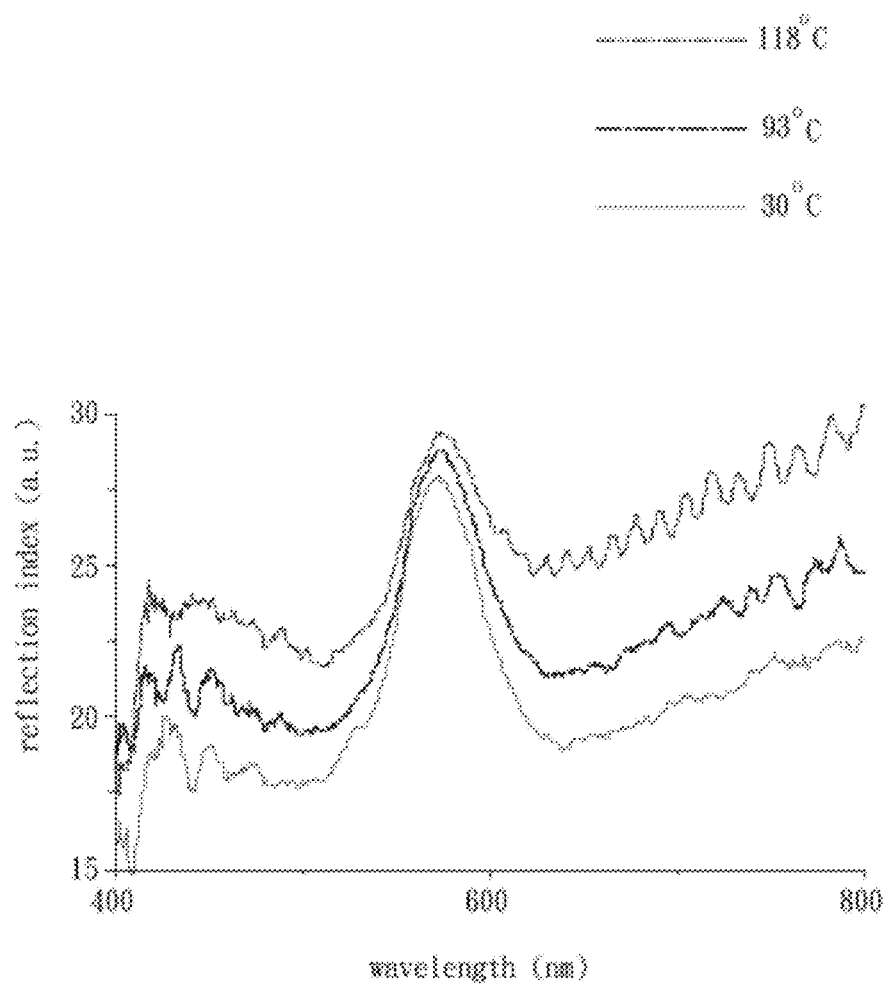
FIG. 8 is a schematic diagram showing the reflection index of the polymer film, which is filled with nematic liquid crystal and heated to different temperatures.

As shown in FIG. 8, when the polymer film filled with the nematic liquid crystal is heated to over the isotropic phase temperature of the liquid crystal (about 90° C.), it can still have stable property of Bragg reflection. This experimental result indicates that the polymer film of the present invention has excellent temperature stability.

In addition, after filling the fluid, the manufacturing method of the polymer film may further include a step of polymerizing the fluid to enhance the stabilization of the polymer film. Herein, it is unnecessary to seal the fluid after the polymerization.

In another embodiment, the mixing step of the manufacturing method of the polymer film is for at least mixing a chiral liquid crystal, a monomer and a photo initiator together to form an LC-monomer mixture. In this embodiment, the chiral liquid crystal is directly used to imprint the chirality to the polymer film instead of using the achiral liquid crystal and the chiral dopant.

In another embodiment, the manufacturing method of the polymer film further includes an alignment step for aligning the LC-monomer mixture. For example, the inner surface of the light-permeable container can be processed with parallel alignment process so as to provide desired alignment effect. The parallel alignment process can be performed with polymer, organic or inorganic layer. When the LC-monomer mixture is filled or mixed in the light-permeable container, the alignment step can make the LC-monomer mixture to present the planar texture structure. After the alignment, the LC-monomer mixture is exposed to induce the polymerization reaction, and then the following steps as mentioned above are performed.

Figure 10:
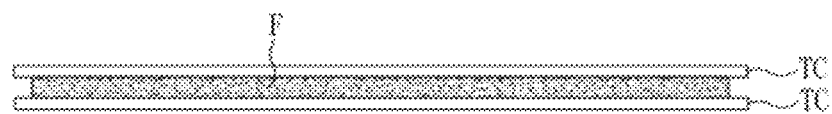
FIG. 10 is a schematic diagram showing the polymer film attached with the transparent conductive film according to the preferred embodiment of the present invention.

In another embodiment, the manufacturing method of the polymer film may further include a step of attaching a transparent conductive film TC on one side of the polymer film F as shown in FIG. 10. In this embodiment, two transparent conductive films TC are attached to the top and bottom sides of the polymer film F, respectively. Of course, if only the top side of the polymer film F is the display surface, the conductive film disposed on the bottom side of the polymer film F can be opaque. The configuration of the transparent conductive film can control the molecular orientation and refraction index of the fluid (e.g. the anisotropic liquid) in the polymer film so as to change the color of the reflected light.

Figure 11:
FIG. 11 is a schematic diagram showing a plurality of stacked polymer films according to the preferred embodiment of the present invention.

In another embodiment, the manufacturing method of the polymer film may further include a step of stacking a plurality of polymer films F to form a multilayer structure polymer film as shown in FIG. 11. The polymer films F can be formed by utilizing the left-handed liquid crystal and the right-handed liquid crystal. Accordingly, the brightness of the reflected light of the polymer film can be enhanced. Theoretically, if only the left-handed or right-handed cholesteric liquid crystal is used for imprinting, only half of the incident light (50%) can be reflected. Therefore, if the polymer films formed by utilizing the left-handed liquid crystal and the right-handed liquid crystal are stacked, the stacked polymer films can provide full reflection (100%).

Figure 9:
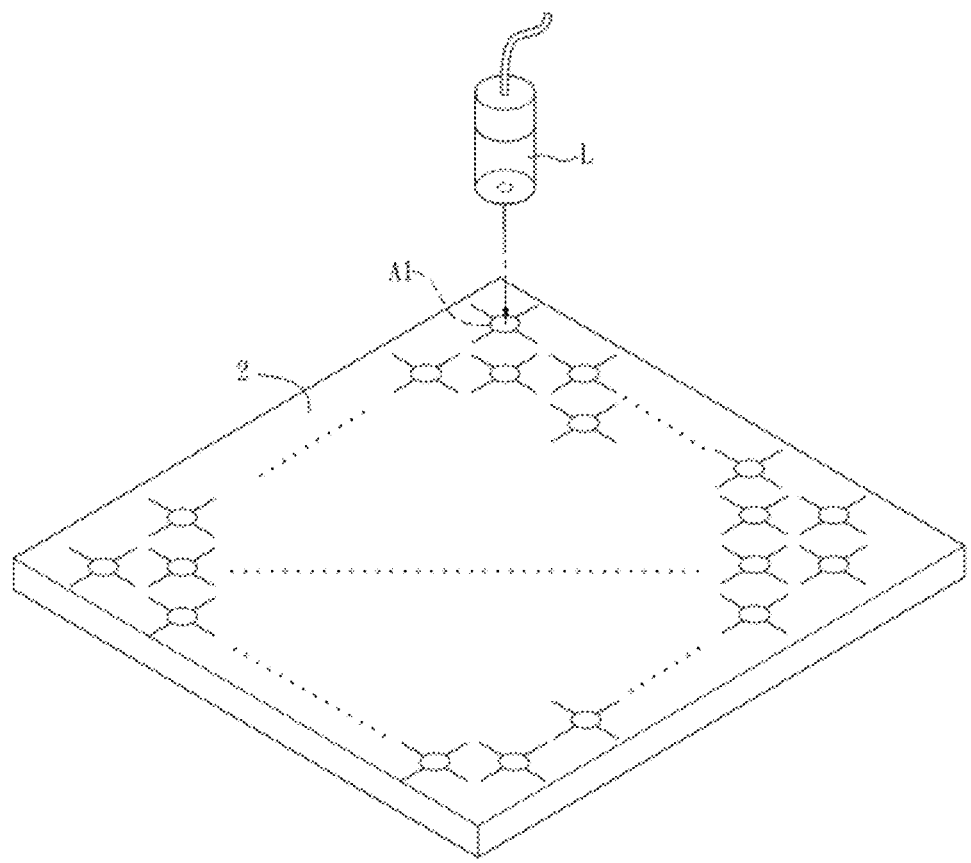
FIG. 9 is a schematic diagram showing the exposure step by the laser according to the preferred embodiment of the present invention.

In another embodiment, the exposure step of the manufacturing method of the polymer film can be modified to use a laser to irradiate at least one exposure area of the LC-monomer mixture. As shown in FIG. 9, a laser head L can emit light to irradiate a plurality of exposure areas A1 (dotted lines areas) of the LC-monomer mixture 2, so that the monomer in the exposure areas A1 may have polymerization reaction to form the polymer. Then, the diffusion step is performed to diffuse the monomer to the exposure areas A1. Of course, it is possible to repeat several times of the exposure step and the diffusion step so as to increase the polymerization rate of the monomer. In the different exposure steps, the laser can irradiate on the same area or different areas. In addition, shapes and the arrangement of the exposure areas A1 are not limited in this embodiment.

In addition, no matter the exposure step is performed by using the mask, laser or their combination, at least two exposure areas of the LC-monomer mixture can have different exposure times, exposure intensities, exposure periods, and diffusion periods. Accordingly, the exposure areas may provide different pitches and/or refractive indexes, so that the Bragg reflection can be applied to the light with different wavelengths. Thus, the application of the polymer film can be broadened. For example, three adjacent exposure areas can respectively reflect three primary colors (e.g. RGB colors).

In summary, the present invention includes the exposure step for exposing at least one exposure area of the LC-monomer mixture, and the diffusion step for diffusing the monomer from the area around the exposure area to the exposure area. Thus, the polymerization rate of the monomers can be enhanced, and the proportion of the polymer in the polymer film and raise the imprint rate of chirality can be increased. Therefore, the polymer film can reveal stronger photonic crystal structure and property of Bragg reflection without being filled with any fluid. In addition, due to the repeat exposure steps and diffusion steps, the polymerization rate of the monomers can be obviously increased so as to provide stronger photonic crystal structure and property of Bragg reflection. Moreover, the present invention can file different fluids including gas or liquid to present different color of the reflected light, thereby broadening the applications of the polymer film. Furthermore, due to the different exposure times, exposure intensities, exposure periods, or diffusion periods, the cholesteric liquid crystal structures in different exposure areas may have different pitches and/or refractive indexes. Accordingly, the wavelength of the light through the Bragg reflection can be changed. In addition, the photonic crystal structure of the polymer film of the present invention can present the Bragg reflection without containing the expansive cholesteric liquid crystal, so that the manufacturing cost can be sufficiently decreased. The polymer film of the present invention can only reflect the light with a specific wavelength and the light with other wavelengths can pass through it. Thus, the polymer film of the present invention can be applied to the design of the color pattern on the surface of the solar cell. It can also be used as the light enhancement film of the LCD backlight module.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A manufacturing method of a polymer film with photonic crystal structure, comprising steps of:

a mixing step for at least mixing an achiral liquid crystal (LC), a chiral dopant, a monomer and a photo initiator together to form an LC-monomer mixture, wherein the LC-monomer mixture is filled in a light-permeable container;

at least one exposure step for exposing the LC-monomer mixture through a mask;

at least one diffusion step for diffusing the monomer from an area around one of exposure areas to the exposure area; and a LC removing step for removing the achiral LC to form the polymer film.

2. The manufacturing method according to claim 1, further comprising a step of:

repeating the exposure step and the diffusion step.

3. The manufacturing method according to claim 1, wherein at least two of the exposure areas of the LC-monomer mixture have different exposure times, exposure intensities, exposure periods, or diffusion periods.

4. The manufacturing method according to claim 1, wherein an inner side of the light-permeable container is processed by a homogeneous parallel alignment process.

5. The manufacturing method according to claim 1, when a plurality of polymer films are formed, further comprising a step of:

stacking the polymer films.

6. The manufacturing method according to claim 1, further comprising:

a filling step for filling a fluid in the polymer film.

7. The manufacturing method according to claim 6, wherein the fluid is a gas or a liquid, and the liquid is an isotropic liquid or an anisotropic liquid.

8. The manufacturing method according to claim 6, further comprising a step of:

attaching a transparent conductive film on one side of the polymer film.

9. A manufacturing method of a polymer film with photonic crystal structure, comprising steps of:

a mixing step for at least mixing a chiral liquid crystal (LC), a monomer and a photo initiator together to form an LC-monomer mixture, wherein the LC-monomer mixture is filled in a light-permeable container;

at least one exposure step for exposing the LC-monomer mixture through a mask;

at least one diffusion step for diffusing the monomer from an area around one of exposure areas to the exposure area; and a LC removing step for removing the chiral LC to form the polymer film.

10. The manufacturing method according to claim 9, further comprising a step of:

repeating the exposure step and the diffusion step.

11. The manufacturing method according to claim 9, wherein at least two of the exposure areas of the LC-monomer mixture have different exposure times, exposure intensities, exposure periods, or diffusion periods.

12. The manufacturing method according to claim 9, wherein an inner side of the light-permeable container is processed by a homogeneous parallel alignment process.

13. The manufacturing method according to claim 9, when a plurality of polymer films are formed, further comprising a step of:

stacking the polymer films.

14. The manufacturing method according to claim 9, further comprising:

a filling step for filling a fluid in the polymer film.

15. The manufacturing method according to claim 14, wherein the fluid is a gas or a liquid, and the liquid is an isotropic liquid or an anisotropic liquid.

16. The manufacturing method according to claim 14, further comprising a step of:

attaching a transparent conductive film on one side of the polymer film.

17. A manufacturing method of a polymer film with photonic crystal structure, comprising steps of:

a mixing step for at least mixing an achiral liquid crystal (LC), a chiral dopant, a monomer and a photo initiator together to form an LC-monomer mixture, wherein the LC-monomer mixture is filled in a light-permeable container;

at least one exposure step for exposing at least one exposure area of the LC-monomer mixture by a laser;

at least one diffusion step for diffusing the monomer from an area around one of the exposure areas to the exposure area; and a LC removing step for removing the achiral LC to form the polymer film.

18. The manufacturing method according to claim 17, further comprising a step of:

repeating the exposure step and the diffusion step.

19. The manufacturing method according to claim 17, wherein at least two of the exposure areas of the LC-monomer mixture have different exposure times, exposure intensities, exposure periods, or diffusion periods.

20. The manufacturing method according to claim 17, wherein an inner side of the light-permeable container is processed by a homogeneous parallel alignment process.

21. The manufacturing method according to claim 17, when a plurality of polymer films are formed, further comprising a step of:

stacking the polymer films.

22. The manufacturing method according to claim 17, further comprising:

a filling step for filling a fluid in the polymer film.

23. The manufacturing method according to claim 22, wherein the fluid is a gas or a liquid, and the liquid is an isotropic liquid or an anisotropic liquid.

24. The manufacturing method according to claim 22, further comprising a step of:

attaching a transparent conductive film on one side of the polymer film.

25. A manufacturing method of a polymer film with photonic crystal structure, comprising steps of:

a mixing step for at least mixing a chiral liquid crystal (LC), a monomer and a photo initiator together to form an LC-monomer mixture, wherein the LC-monomer mixture is filled in a light-permeable container;

at least one exposure step for exposing at least one exposure area of the LC-monomer mixture by a laser;

at least one diffusion step for diffusing the monomer from an area around one of the exposure areas to the exposure area; and a LC removing step for removing the chiral LC to form the polymer film.

26. The manufacturing method according to claim 25, further comprising a step of:

repeating the exposure step and the diffusion step.

27. The manufacturing method according to claim 25, wherein at least two of the exposure areas of the LC-monomer mixture have different exposure times, exposure intensities, exposure periods, or diffusion periods.

28. The manufacturing method according to claim 25, wherein an inner side of the light-permeable container is processed by a homogeneous parallel alignment process.

29. The manufacturing method according to claim 25, when a plurality of polymer films are formed, further comprising a step of:

stacking the polymer films.

30. The manufacturing method according to claim 25, further comprising:

a filling step for filling a fluid in the polymer film.

31. The manufacturing method according to claim 30, wherein the fluid is a gas or a liquid, and the liquid is an isotropic liquid or an anisotropic liquid.

32. The manufacturing method according to claim 30, further comprising a step of:

attaching a transparent conductive film on one side of the polymer film.

* * * * *